US012756551B2

(12) United States Patent
Janakiraman et al.

(10) Patent No.: US 12,756,551 B2
(45) Date of Patent: Oct. 6, 2026

(54) SYSTEMS, APPARATUSES, METHODS, AND COMPUTER PROGRAM PRODUCTS FOR GENERATING AN AVIATION OPERATIONS PACKAGE

(71) Applicant: Honeywell International Inc., Charlotte, NC (US)

(72) Inventors: Kirupakar Janakiraman, Madurai (IN); Kalimulla Khan, Bangalore (IN); Saravana Samy, Madurai (IN); Robert Son, Phoenix, AZ (US); Ari Narayanan, Madurai (IN); Sunil Sharma, Bangalore (IN); Anand Krishna, Bangalore (IN); Angelo Koutsogiannis, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 26 days.

(21) Appl. No.: 18/883,286

(22) Filed: Sep. 12, 2024

(65) Prior Publication Data

US 2026/0005851 A1 Jan. 1, 2026

(30) Foreign Application Priority Data

Jun. 27, 2024 (IN) ............................. 202411049305

(51) Int. Cl.
*H04L 9/08* (2006.01)
*H04L 9/32* (2006.01)

(52) U.S. Cl.
CPC ............ *H04L 9/088* (2013.01); *H04L 9/0861* (2013.01); *H04L 9/32* (2013.01)

(58) Field of Classification Search
CPC .......... H04L 9/088; H04L 9/0861; H04L 9/32
See application file for complete search history.

(56) References Cited

U.S. PATENT DOCUMENTS

2012/0177198 A1* 7/2012 Cabos ................. H04L 63/0428 380/270
2017/0187539 A1* 6/2017 Thompson .......... H04W 12/068
2019/0340937 A1* 11/2019 Villa ........................ G08G 5/30
(Continued)

FOREIGN PATENT DOCUMENTS

EP 2945348 A1 11/2015

OTHER PUBLICATIONS

Shaikh et al., "A Review of Recent Advances and Security Challenges in Emerging E-Enabled Aircraft Systems", May 2019, IEEE Access, vol. 7, pp. 63164-63180 (Year: 2019).*
(Continued)

*Primary Examiner* — Kenneth W Chang
(74) *Attorney, Agent, or Firm* — Alston & Bird LLP

(57) ABSTRACT

Systems, apparatuses, methods, and computer program products are provided herein. For example, a method may include receiving aviation operations database status data associated with an aviation operations database. In some embodiments, the method may include generating an aviation operations package based on the aviation operations database status data. In some embodiments, the method may include encrypting the aviation operations package using a cloud-based key. In some embodiments, the method may include deploying the aviation operations package to an onboard aviation operations device.

19 Claims, 7 Drawing Sheets

(56) References Cited

U.S. PATENT DOCUMENTS

| | | | | |
|---|---|---|---|---|
| 2021/0311713 | A1 | 10/2021 | De Meulder | |
| 2022/0085981 | A1* | 3/2022 | Selvarajan | H04L 9/3247 |
| 2022/0207055 | A1 | 6/2022 | Plantinga et al. | |
| 2022/0208011 | A1* | 6/2022 | Holmes | H04W 4/42 |
| 2022/0408245 | A1* | 12/2022 | Maass | H04W 12/041 |
| 2023/0273938 | A1* | 8/2023 | Plantinga | G06F 16/2343 707/615 |
| 2024/0062166 | A1* | 2/2024 | List | G06Q 10/087 |

OTHER PUBLICATIONS

Extended European Search Report for EP Patent Application No. 153289EP00 dated Oct. 1, 2025 (9 pages).

* cited by examiner

SYSTEMS, APPARATUSES, METHODS, AND COMPUTER PROGRAM PRODUCTS FOR GENERATING AN AVIATION OPERATIONS PACKAGE

CROSS-REFERENCE TO RELATED APPLICATIONS

The present application claims priority to Indian Provisional Application No. 202411049305, titled "SYSTEMS, APPARATUSES, METHODS, AND COMPUTER PROGRAM PRODUCTS FOR GENERATING AN AVIATION OPERATIONS PACKAGE," filed Jun. 27, 2024, the contents of which are incorporated herein by reference in their entirety

TECHNOLOGICAL FIELD

Embodiments of the present disclosure relate generally to systems, apparatuses, methods, and computer program products for generating an aviation operations package.

BACKGROUND

Applicant has identified many technical challenges and difficulties associated with systems, apparatuses, methods, and computer program products for updating aviation databases. Through applied effort, ingenuity, and innovation, Applicant has solved problems related to systems, apparatuses, methods, and computer program products for updating aviation databases by developing solutions embodied in the present disclosure, which are described in detail below.

BRIEF SUMMARY

Various embodiments described herein relate to systems, apparatuses, methods, and computer program products for generating an aviation operations package.

In accordance with one aspect of the disclosure, a system is provided. In some embodiments, the system comprises a cloud-based aviation operations device. In some embodiments, the cloud-based aviation operations device comprises memory and one or more processors communicatively coupled to the memory. In some embodiments, the one or more processors are configured to receive aviation operations database status data associated with an aviation operations database. In some embodiments, the one or more processors are configured to generate an aviation operations package based on the aviation operations database status data. In some embodiments, the one or more processors are configured to encrypt the aviation operations package using a cloud-based key. In some embodiments, the one or more processors are configured to deploy the aviation operations package to an onboard aviation operations device.

In some embodiments, aviation operations database status data is received from the onboard aviation operations device.

In some embodiments, the aviation operations package comprises an aviation operations database update package and one or more aviation-related tuples.

In some embodiments, the one or more aviation-related tuples are indicative of one or more of an aircraft tail identification, a flight management system identification, an aircraft manufacturer identification, an aircraft type indication, an aviation operations database type indication, or an aircraft region indication.

In some embodiments, the onboard aviation operations device comprises a flight management system.

In some embodiments, the onboard aviation operations device is physically secured to an aircraft.

In some embodiments, the aviation operations package is deployed to the onboard aviation operations device via an avionics gateway.

In some embodiments, the one or more processors are configured to receive aircraft registration data.

In some embodiments, the aircraft registration data comprises an aircraft registration request and one or more aviation-related tuples.

In some embodiments, the one or more processors are configured to generate the cloud-based key.

In some embodiments, the one or more processors are configured to store the cloud-based key.

In some embodiments, the one or more processors are configured to generate an onboard key.

In some embodiments, the one or more processors are configured to deploy the onboard key to the onboard aviation operations device.

In some embodiments, the one or more processors are configured to determine that the aviation operations database is associated with an update needed status based on the aviation operations database status data.

In some embodiments, the aviation operations package is generated in response to the determination that the aviation operations database is associated with the update needed status.

In some embodiments, the system further comprises the onboard aviation operations device. In some embodiments, the onboard aviation operations device comprises second memory and one or more second processors communicatively coupled to the second memory. In some embodiments, the one or more second processors are configured to receive the aviation operations package. In some embodiments, the one or more second processors are configured to decrypt the aviation operations package using an onboard key.

In some embodiments, the aviation operations package comprises an aviation operations database update package and one or more aviation-related tuples.

In some embodiments, the one or more second processors are configured to verify the aviation operations database update package using the one or more aviation-related tuples.

In some embodiments, the one or more second processors are configured to perform one or more update viability operations on the aviation operations database.

In some embodiments, the one or more second processors are configured to cause the aviation operations database to be updated using the aviation operations database update package.

In some embodiments, the one or more second processors are configured to perform one or more update loaded operations on the aviation operations database.

In some embodiments, the one or more second processors are configured to generate an aviation operations interface component.

In some embodiments, the one or more second processors are configured to cause the aviation operations interface component to be rendered to an aviation operations interface.

In accordance with another aspect of the disclosure, a method is provided. In some embodiments, the method may include receiving aviation operations database status data associated with an aviation operations database. In some embodiments, the method may include generating an aviation operations package based on the aviation operations database status data. In some embodiments, the method may include encrypting the aviation operations package using a cloud-based key. In some embodiments, the method may include deploying the aviation operations package to an onboard aviation operations device.

In some embodiments, the aviation operations package comprises an aviation operations database update package and one or more aviation-related tuples.

In some embodiments, the method may include generating the cloud-based key.

In some embodiments, the method may include storing the cloud-based key.

In some embodiments, the method may include generating an onboard key.

In some embodiments, the method may include deploying the onboard key to the onboard aviation operations device.

In some embodiments, the method may include receiving the aviation operations package.

In some embodiments, the method may include decrypting the aviation operations package using an onboard key.

In some embodiments, the aviation operations package comprises an aviation operations database update package and one or more aviation-related tuples.

In some embodiments, the method may include verifying the aviation operations database update package using the one or more aviation-related tuples.

In accordance with another aspect of the disclosure, a computer program product is provided. In some embodiments, the computer program product includes at least one non-transitory computer-readable storage medium having computer program code stored thereon.

In some embodiments, the computer program code, in execution with at least one processor, configures the computer program product for receiving aviation operations database status data associated with an aviation operations database. In some embodiments, the computer program code, in execution with at least one processor, configures the computer program product for generating an aviation operations package based on the aviation operations database status data. In some embodiments, the computer program code, in execution with at least one processor, configures the computer program product for encrypting the aviation operations package using a cloud-based key. In some embodiments, the computer program code, in execution with at least one processor, configures the computer program product for deploying the aviation operations package to an onboard aviation operations device.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
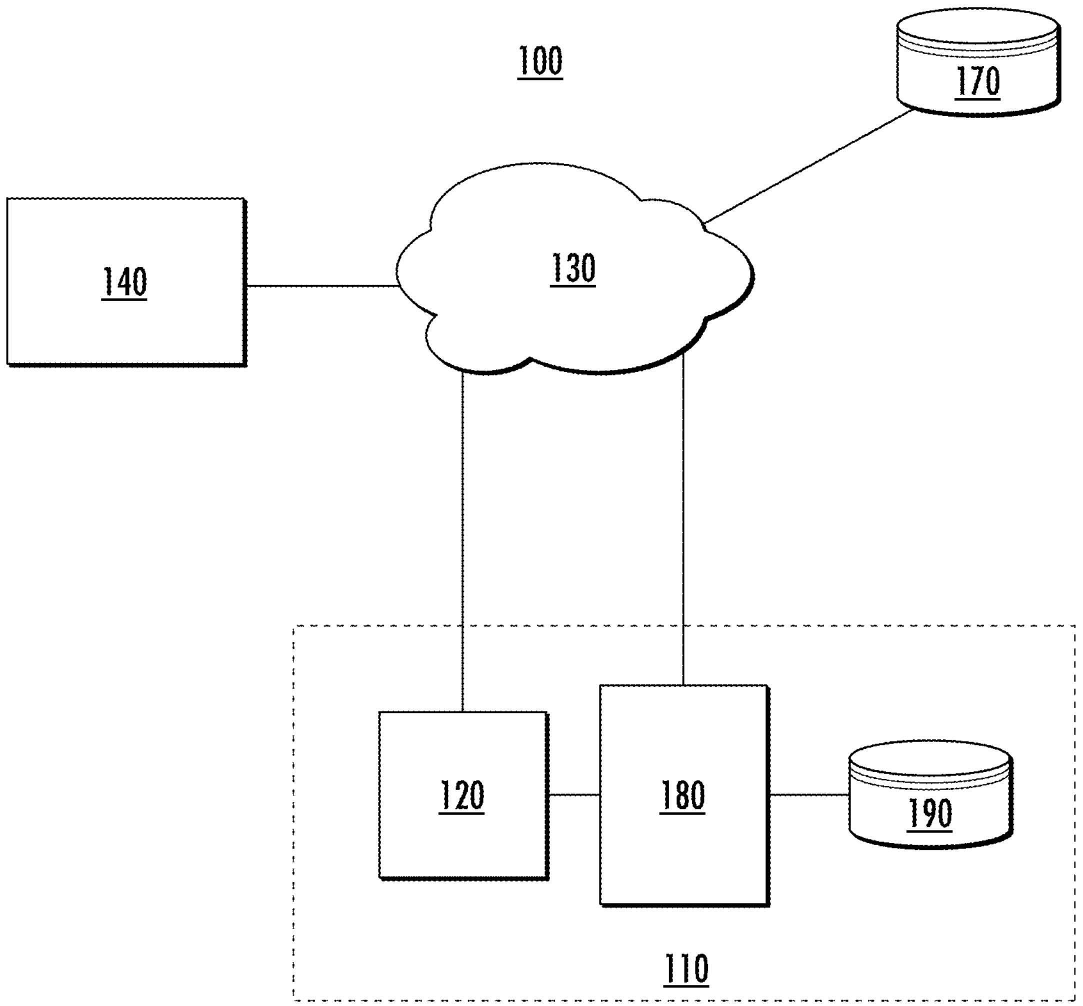
FIG. 1 illustrates an example block diagram of an environment in which embodiments of the present disclosure may operate.

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system, or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively, or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

Overview

Example embodiments disclosed herein address technical problems associated with updating an aviation database. As would be understood by one skilled in the field to which this disclosure pertains, there are numerous example scenarios in which it may be desirable to update an aviation database.

In many applications, systems, apparatuses, methods, and computer program products for updating an aviation database are desirable. In some implementations, it may be desirable to update an aviation database associated with an aircraft. For example, it may be desirable to update an aviation database associated with an aircraft based on an update prepared by a cloud-based device. In this way, an aviation database may be up to date, secure, and enable efficient aviation operations. For example, the aviation database may enable accurate, secure, and efficient in-flight navigation using navigation data from an updated aviation database.

Example solutions for updating an aviation database include using a storage medium to facilitate an aviation database update. However, such example solutions are inefficient, unsecure, lack specificity, and suffer from high latency. For example, such example solutions are inefficient because such example solutions use a storage medium to transfer an aviation database update from a first device that prepares the update to a second device that implements the update. As another example, such example solutions are unsecure because the storage medium that is used to facilitate the aviation database update is not encrypted. As a result, the storage medium that is used to facilitate the aviation database update can be used as an entry point for a malicious actor to compromise the aviation database. As another example, such example solutions lack specificity because updates to aviation databases are not generated for specific aviation databases associated with specific aircraft. As a result, in such example solutions, a storage medium may be used to facilitate updating of aviation databases that are not authorized to receive an update. As another example, such example solutions suffer from high latency because such example solutions use inefficient computing techniques for preparing and implementing an update of an aviation database. Accordingly, there is a need for systems, apparatuses, methods, and computer program products for generating an aviation operations package that can be used to update an aviation database in an efficient, secure, specific, and low latency manner.

Thus, to address these and/or other issues related to such example solutions, example systems, apparatuses, methods, and computer program products for generating an aviation operations package are disclosed herein. For example, an embodiment, in this disclosure, described in greater detail below, includes a system that includes a cloud-based aviation operations device. In some embodiments, the cloud-based aviation operations device is configured to receive aviation operations database status data associated with an aviation operations database. In some embodiments, the cloud-based aviation operations device is configured to generate an aviation operations package based on the aviation operations database status data. In some embodiments, the cloud-based aviation operations device is configured to encrypt the aviation operations package using a cloud-based key. In some embodiments, the cloud-based aviation operations device is configured to deploy the aviation operations package to an onboard aviation operations device. Accordingly, the systems, apparatuses, methods, and computer program products disclosed herein enable updating of an aviation database in an efficient, secure, specific, and low latency manner.

Example Systems and Apparatuses

Embodiments of the present disclosure herein include systems, apparatuses, methods, and computer program products configured for generating an aviation operations package. It should be readily appreciated that the embodiments of the apparatus, systems, methods, and computer program product described herein may be configured in various additional and alternative manners in addition to those expressly described herein.

FIG. 1 illustrates an example block diagram of an environment 100 in which embodiments of the present disclosure may operate. Specifically, FIG. 1 illustrates an aircraft 110. In some embodiments, the aircraft 110 may describe any machine, robot, computing devices, and/or apparatus comprised of hardware, software, firmware, and/or any combination thereof, that maneuvers throughout an environment through a medium, such as air. In some contexts, the aircraft 110 is utilized to transport objects, entities (e.g., people, animals, or other beings), and/or other onboard cargo. In some situations, the aircraft 110 may be transporting no object except for the aircraft itself. Examples of the aircraft 110 include airplanes, helicopters, drones, and/or the like. In some embodiments, the aircraft 110 is not limited to the examples listed herein and may include other types of transportation device.

In some embodiments, the aircraft 110 is associated with a determinable location. The determinable location of the aircraft 110 in some embodiments represents an absolute position (e.g., GPS coordinates, latitude and longitude locations, an address, and/or the like) or a relative position of the aircraft 110 (e.g., an identifier representing the location of the aircraft 110 as compared to one or more other aircraft, one or more buildings (e.g., an airport), an enterprise headquarters, or general description in the world for example based at least in part on continent, state, ocean, or other definable region). In some embodiments, the aircraft 110 includes or otherwise is associated with a location sensor and/or software-driven location services that provide the location data corresponding to the aircraft 110. In other embodiments, the location of the aircraft 110 is stored and/or otherwise determinable to one or more systems.

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

In some embodiments, the environment 100 includes a cloud-based aviation operations device 140. In some embodiments, the cloud-based aviation operations device 140 is electronically and/or communicatively coupled to the aircraft 110, an avionics gateway 120, one or more databases 170, an onboard aviation operations device 180, and/or an aviation operations database 190. The cloud-based aviation operations device 140 may be located remotely from the aircraft 110. In this regard, for example, the cloud-based aviation operations device 140 may be located in a remote cloud server and electronically and/or communicatively coupled to the aircraft 110, the avionics gateway 120, the one or more databases 170, the onboard aviation operations device 180, and/or the aviation operations database 190 via at least the network 130. In some embodiments, the cloud-based aviation operations device 140 is configured via hardware, software, firmware, and/or a combination thereof, to perform data intake of one or more types of data, such aviation operations database status data, aircraft registration data, and/or the like.

Additionally, or alternatively, in some embodiments, the cloud-based aviation operations device 140 is configured via hardware, software, firmware, and/or a combination thereof, to generate and/or transmit command(s) that control, adjust, or otherwise impact operations of one or more of the aircraft 110, the avionics gateway 120, the one or more databases 170, the onboard aviation operations device 180, and/or the aviation operations database 190. For example, the cloud-based aviation operations device 140 may be configured to generate an aviation operations package. Additionally, or alternatively, in some embodiments, the cloud-based aviation operations device 140 is configured via hardware, software, firmware, and/or a combination thereof, to perform data reporting, provide data, and/or other data output process(es) associated with monitoring or otherwise analyzing operations of one or more of the aircraft 110, the avionics gateway 120, the one or more databases 170, the onboard aviation operations device 180, and/or the aviation operations database 190. For example, in various embodiments, the cloud-based aviation operations device 140 may be configured to execute and/or perform one or more operations and/or functions described herein.

In some embodiments, the environment 100 includes the avionics gateway 120. In some embodiments, the avionics gateway 120 is electronically and/or communicatively coupled to the aircraft 110, the cloud-based aviation operations device 140, the one or more databases 170, the onboard aviation operations device 180, and/or the aviation operations database 190. The avionics gateway 120 may be located remotely from the aircraft 110 (e.g., in a control tower at an airport), in proximity of the aircraft (e.g., near the aircraft 110), and/or within the aircraft 110 (e.g., as a component of the aircraft 110). In some embodiments, the avionics gateway 120 is configured via hardware, software, firmware, and/or a combination thereof, to facilitate communication between the aircraft 110, the cloud-based aviation operations device 140, the one or more databases 170, the onboard aviation operations device 180, and/or the aviation operations database 190.

In some embodiments, the environment 100 includes the onboard aviation operations device 180. In some embodiments, the onboard aviation operations device 180 is electronically and/or communicatively coupled to the aircraft 110, the cloud-based aviation operations device 140, the one or more databases 170, the avionics gateway 120, and/or the aviation operations database 190. The onboard aviation operations device 180 may be located within the aircraft 110. In this regard, for example may be one or more individual components of the aircraft that perform a particular function during operation of the aircraft 110. For example, the onboard aviation operations device 180 may include one or more of multi-function control and display units (MCDU), flight management systems (FMS), inertial reference systems (IRS), sensors, actuators, primary flight displays, radars (e.g., weather radars, engines, auxiliary power units (APU), enhanced ground proximity warning systems (EGPWS), and/or the like. In this regard, for example, the individual components of the aircraft 110 may include components associated with a particular process or operation performed by the aircraft 110. In some embodiments, the onboard aviation operations device 180 is physically secured to the aircraft 110.

In some embodiments, the onboard aviation operations device 180 is configured via hardware, software, firmware, and/or a combination thereof, to perform data intake of one or more types of data, such as aviation operations database status data, aircraft registration data, and/or the like. Additionally, or alternatively, in some embodiments, the onboard aviation operations device 180 is configured via hardware, software, firmware, and/or a combination thereof, to generate and/or transmit command(s) that control, adjust, or otherwise impact operations of one or more of cloud-based aviation operations device 140, the one or more databases 170, the avionics gateway 120, and/or the aviation operations database 190. For example, the onboard aviation operations device 180 may be configured to cause the aviation operations database 190 to be updated using an aviation operations database update package. Additionally, or alternatively, in some embodiments, the onboard aviation operations device 180 are configured via hardware, software, firmware, and/or a combination thereof, to perform data reporting, provide data, and/or other data output process(es) associated with monitoring or otherwise analyzing operations of one or more of cloud-based aviation operations device 140, the one or more databases 170, the avionics gateway 120, and/or the aviation operations database 190. For example, in various embodiments, the onboard aviation operations device 180 may be configured to execute and/or perform one or more operations and/or functions described herein.

The aviation operations database 190 may be configured to receive, store, and/or transmit data. For example, the aviation operations database 190 may be configured to receive, store, and/or transmit data associated with the aircraft 110, the cloud-based aviation operations device 140, the onboard aviation operations device 180, the avionics gateway 120, and/or the one or more databases 170. In this regard, for example, the aviation operations database 190 may be configured to receive, store, and/or transmit aviation operations database status data, aircraft registration data, and/or the like. In some embodiments, the aviation operations database 190 is configured to be updated. For example, the aviation operations database 190 may be configured to be updated using an aviation operations database update package. The one or more databases 170 may be located remotely from the aircraft 110, in proximity of the aircraft 110, and/or within the aircraft 110. For example, the aviation operations database 190 may be physically secured to the aircraft 110 in proximity to the onboard aviation operations device 180.

The one or more databases 170 may be configured to receive, store, and/or transmit data. For example, the one or more databases 170 may be configured to receive, store, and/or transmit data associated with the aircraft 110 the cloud-based aviation operations device 140, the onboard aviation operations device 180, the avionics gateway 120, and/or the aviation operations database 190. In this regard, for example, the one or more databases 170 may be configured to receive, store, and/or transmit aviation operations database status data, aircraft registration data, and/or the like. The one or more databases 170 may be located remotely from the aircraft 110, in proximity of the aircraft 110, and/or within the aircraft 110.

Additionally, while FIG. 1 illustrates certain components as separate, standalone entities communicating over the network 130, various embodiments are not limited to this configuration. In other embodiments, one or more components may be directly connected and/or share hardware or the like. For example, in some embodiments, the cloud-based aviation operations device 140 may include the one or more databases 170.

Figure 2:
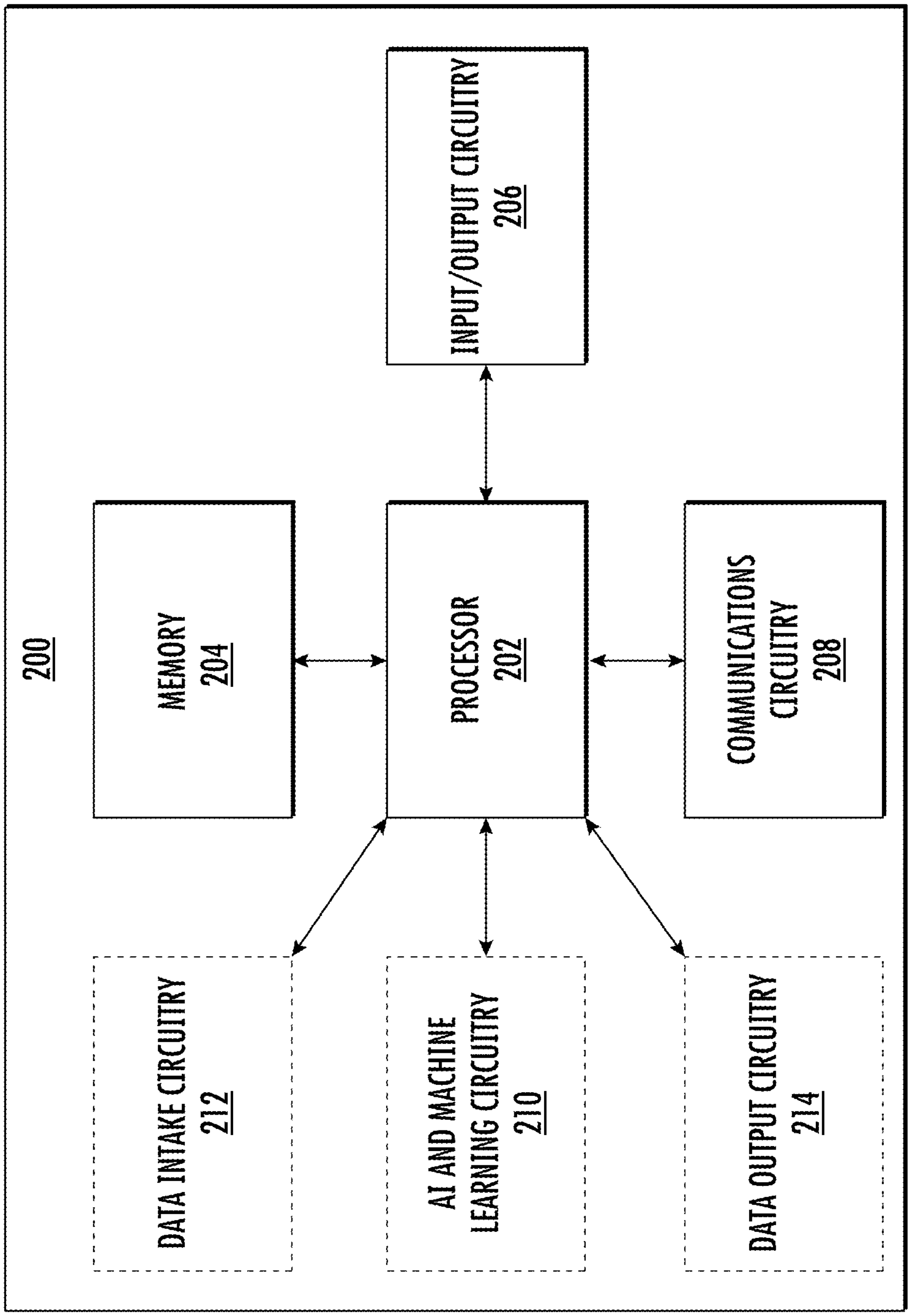
FIG. 2 illustrates an example block diagram of an example apparatus that may be specially configured in accordance with an example embodiment of the present disclosure.

FIG. 2 illustrates an example block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. For example, the computing apparatus 200 may be embodied as one or more of a specifically configured personal computing apparatus, a specifically configured cloud-based computing apparatus, a specifically configured embedded computing device (e.g., configured for edge computing, and/or the like). Examples of an apparatus 200 may include, but is not limited to, the aircraft 110, the cloud-based aviation operations device 140, the onboard aviation operations device 180, the avionics gateway 120, the aviation operations database 190, and/or the one or more databases 170. The apparatus 200 includes processor 202, memory 204, input/output circuitry 206, communications circuitry 208, and/or optional artificial intelligence ("AI") and machine learning circuitry 210. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, such as computing apparatus 200 of the aircraft 110, the cloud-based aviation operations device 140, the onboard aviation operations device 180, the avionics gateway 120, the aviation operations database 190, and/or the one or more databases 170 may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally, or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device, one or more sensors, and/or other external computing device(s) in communication with the apparatus 200.

Data intake circuitry 212 may be included in the apparatus 200. The data intake circuitry 212 may include hardware, software, firmware, and/or a combination thereof, designed and/or configured to capture, receive, request, and/or otherwise gather data associated with operations of the aircraft 110. In some embodiments, the data intake circuitry 212 includes hardware, software, firmware, and/or a combination thereof, that communicates with one or more sensor(s) component(s), and/or the like within the aircraft 110 to receive particular data associated with such operations of the aircraft 110. Additionally, or alternatively, in some embodiments, the data intake circuitry 212 includes hardware, software, firmware, and/or a combination thereof, that retrieves particular data associated with the aircraft 110 from one or more data repository/repositories accessible to the apparatus 200.

AI and machine learning circuitry 210 may be included in the apparatus 200. The AI and machine learning circuitry 210 may include hardware, software, firmware, and/or a combination thereof designed and/or configured to request, receive, process, generate, and transmit data, data structures, control signals, and electronic information for training and executing a trained AI and machine learning model configured for facilitating the operations and/or functionalities described herein. For example, in some embodiments the AI and machine learning circuitry 210 includes hardware, software, firmware, and/or a combination thereof, that identifies training data and/or utilizes such training data for training a particular machine learning model, AI, and/or other model to generate particular output data based at least in part on learnings from the training data. Additionally, or alternatively, in some embodiments, the AI and machine learning circuitry 210 includes hardware, software, firmware, and/or a combination thereof, that embodies or retrieves a trained machine learning model, AI and/or other specially configured model utilized to process inputted data. Additionally, or alternatively, in some embodiments, the AI and machine learning circuitry 210 includes hardware, software, firmware, and/or a combination thereof that processes received data utilizing one or more algorithm(s), function(s), subroutine(s), and/or the like, in one or more pre-processing and/or subsequent operations that need not utilize a machine learning or AI model.

Data output circuitry 214 may be included in the apparatus 200. The data output circuitry 214 may include hardware, software, firmware, and/or a combination thereof, that configures and/or generates an output based at least in part on data processed by the apparatus 200. In some embodiments, the data output circuitry 214 includes hardware, software, firmware, and/or a combination thereof, that generates a particular report based at least in part on the processed data, for example where the report is generated based at least in part on a particular reporting protocol. Additionally, or alternatively, in some embodiments, the data output circuitry 214 includes hardware, software, firmware, and/or a combination thereof, that configures a particular output data object, output data file, and/or user interface for storing, transmitting, and/or displaying. For example, in some embodiments, the data output circuitry 214 generates and/or specially configures a particular data output for transmission to another system sub-system for further processing. Additionally, or alternatively, in some embodiments, the data output circuitry 214 includes hardware, software, firmware, and/or a combination thereof, that causes rendering of a specially configured user interface based at least in part on data received by and/or processing by the apparatus 200.

In some embodiments, two or more of the sets of circuitries 202-214 are combinable. Alternatively, or additionally, one or more of the sets of circuitry 202-214 perform some or all of the operations and/or functionality described herein as being associated with another circuitry. In some embodiments, two or more of the sets of circuitry 202-214 are combined into a single module embodied in hardware, software, firmware, and/or a combination thereof. For example, in some embodiments, one or more of the sets of circuitry, for example the AI and machine learning circuitry 210, may be combined with the processor 202, such that the processor 202 performs one or more of the operations described herein with respect to the AI and machine learning circuitry 210.

Figure 3:
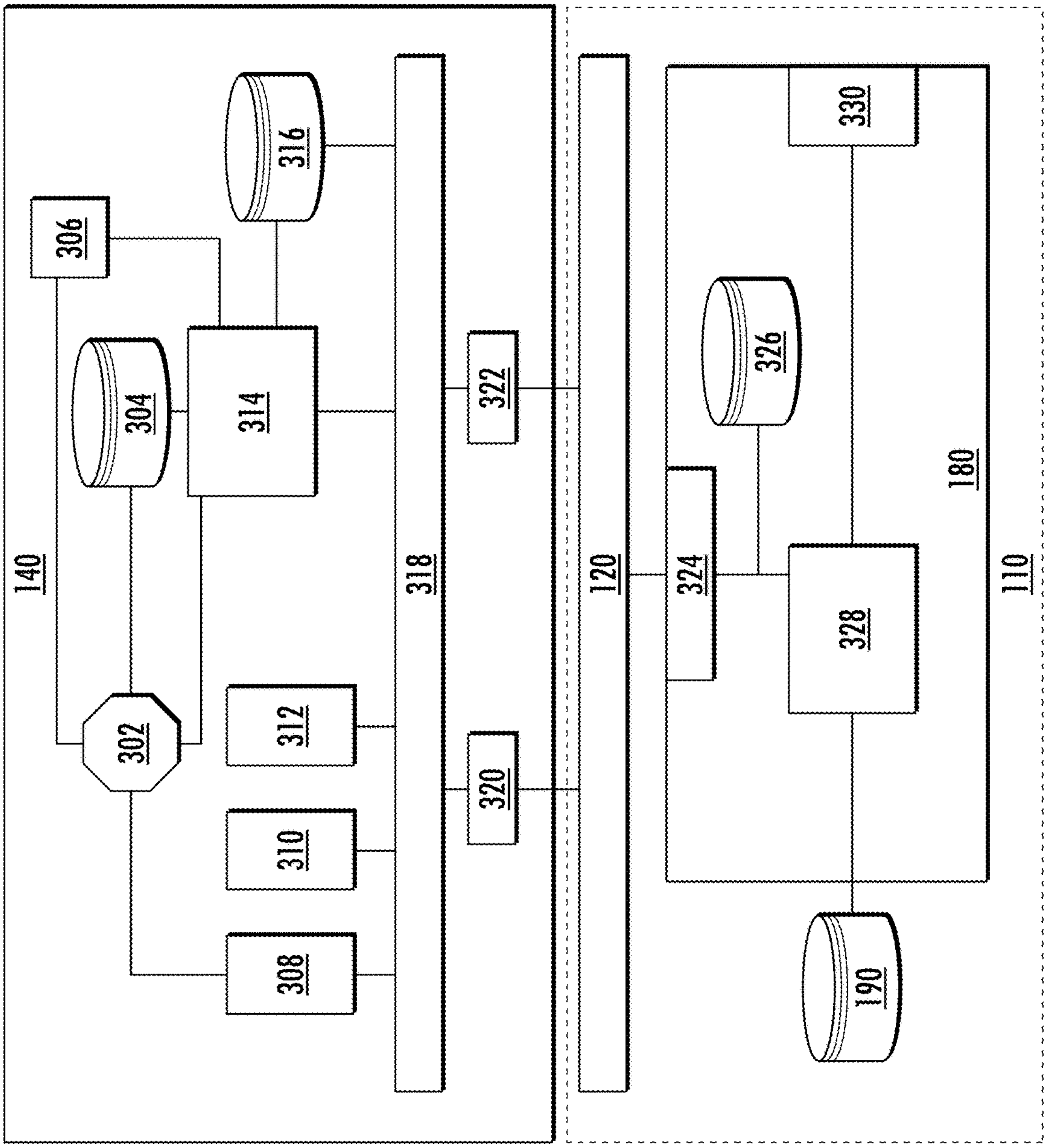
FIG. 3 illustrates an example architecture in accordance with one or more embodiments of the present disclosure.

FIG. 3 illustrates an example architecture of the cloud-based aviation operations device 140, the avionics gateway 120, the onboard aviation operations device 180, and the aviation operations database 190.

In some embodiments, the cloud-based aviation operations device 140 is configured to receive aircraft registration data. In some embodiments, aircraft registration data includes one or more items of data representative and/or indicative of an aircraft registration request. In some embodiments, an aircraft registration request is a request for participation in over the air updates that are provided by the cloud-based aviation operations device 140. For example, an aircraft registration request may be a request for participation in over the air updates for the aviation operations database 190 that is provided by the cloud-based aviation operations device 140.

Additionally, or alternatively, aircraft registration data comprises one or more items of data representative and/or indicative of one or more aviation-related tuples. For example, an aviation-related tuple may be indicative of an aircraft tail identification (e.g., a tail number associated with the aircraft 110. As another example, an aviation-related tuple may be indicative of a flight management system identification (e.g., a flight management system associated with the aircraft 110). As another example, an aviation-related tuple may be indicative of an aircraft manufacturer identification (e.g., an identification of a manufacturer of the aircraft 110). As another example, an aviation-related tuple may be indicative of an aircraft type indication (e.g., a type of the aircraft 110, such as an airplane, helicopter, unmanned aerial vehicle, (UAV), etc.). As another example, an aviation-related tuple may be indicative of an aircraft region indication (e.g., a country in which the aircraft 110 is based). As another example, an aviation-related tuple may be indicative of an aviation operations database type indication. For example, an aviation operations database type indication may be one or more of a navigation database, a magnetic variation database (e.g., a MagVar database), a takeoff and landing data database (e.g., a TOLD database), an aero-engine database (e.g., an AEDB database), and/or the like.

In some embodiments, the cloud-based aviation operations device 140 is configured to receive at least a portion of aircraft registration data from the onboard aviation operations device 180. In this regard, for example, the onboard aviation operations device 180 may be configured to transmit aircraft registration data to the cloud-based aviation operations device 140 via the avionics gateway 120. Additionally, or alternatively, the cloud-based aviation operations device 140 is configured to receive at least a portion of aircraft registration data from one or more other computing devices. For example, the cloud-based aviation operations device 140 may be configured to receive at least a portion of aircraft registration data from a remote computing device (e.g., an enterprise computing device associated with an enterprise that owns and/or operates the aircraft 110). Additionally, or alternatively, the cloud-based aviation operations device 140 is configured to receive at least a portion of aircraft registration data directly into the cloud-based aviation operations device 140 (e.g., aircraft registration data may be inputted directly into the cloud-based aviation operations device 140). In this regard, for example, the cloud-based aviation operations device 140 may include a cloud-based internet of things hub 320 configured to facilitate receiving aircraft registration data by the cloud-based aviation operations device 140.

In some embodiments, the cloud-based aviation operations device 140 is configured to register the aircraft 110. In this regard, for example, the cloud-based aviation operations device 140 may be configured to register the aircraft 110 for receiving over the air updates that are provided by the cloud-based aviation operations device 140. For example, the cloud-based aviation operations device 140 may be configured to register the aircraft 110 for receiving over the air updates to the aviation operations database 190 that are provided by the cloud-based aviation operations device 140. In some embodiments, the cloud-based aviation operations device 140 is configured to register the aircraft 110 in response to receiving aircraft registration data. In some embodiments, the cloud-based aviation operations device 140 is configured to register the aircraft 110 using an over the air service 310 and/or a services administrator 314. For example, the services administrator 314 may be configured to determine if the aircraft 110 is associated with a license for receiving over the air updates provided by the cloud-based aviation operations device 140. In some embodiments, the cloud-based aviation operations device 140 is configured to store the one or more aviation-related tuples in an aviation-related tuples database 316. For example, the cloud-based aviation operations device 140 may be configured to store the one or more aviation-related tuples in the aviation-related tuples database 316 such that the one or more aviation-related tuples may be later retrieved by the cloud-based aviation operations device 140.

In some embodiments, the cloud-based aviation operations device 140 is configured to generate a cloud-based key. In some embodiments, a cloud-based key is a unique cryptographic key that may be used by the cloud-based aviation operations device 140 to encrypt data and/or information, such that data and/or information may be transmitted securely from the cloud-based aviation operations device 140. In some embodiments, the cloud-based key corresponds to a public key. In some embodiments, the cloud-based aviation operations device 140 is configured to generate the cloud-based key using cryptographic service 308.

In some embodiments, the cloud-based aviation operations device 140 is configured to generate an onboard key. In some embodiments, an onboard key is a unique cryptographic key that may be used by the onboard aviation operations device 180 to decrypt data and/or information, such that data and/or information may be transmitted securely to the onboard aviation operations device 180 (e.g., the onboard aviation operations device 180 can receive encrypted data from the cloud-based aviation operations device 140 and decrypt the received data). In some embodiments, the onboard key corresponds to a private key. In some embodiments, the cloud-based aviation operations device 140 is configured to generate the onboard key using cryptographic service 308.

In some embodiments, the cloud-based aviation operations device 140 is configured to store the cloud-based key in a cloud-based key database 304. In some embodiments, the cloud-based key may be transferred from the cryptographic service 308 to the cloud-based key database 304 using a message bus 318. In some embodiments, the cloud-based aviation operations device 140 is configured to deploy the onboard key to the onboard aviation operations device 180. In this regard, for example, the cloud-based aviation operations device 140 may be configured to transmit the onboard key to the onboard aviation operations device 180. In some embodiments, the cloud-based aviation operations device 140 is configured to use deployment service 322 to deploy the onboard key to the onboard aviation operations device 180 via the avionics gateway 120. In this regard, for example, the onboard key may be provided from the cryptographic service 308 to the deployment service 322 using the message bus 318.

In some embodiments, the onboard aviation operations device 180 is configured to receive the onboard key. For example, the onboard aviation operations device 180 may be configured to receive the onboard key via the avionics gateway 120. In some embodiments, the onboard aviation operations device 180 includes include a software development kit 324 that facilitates communication with the avionics gateway 120, the cloud-based aviation operations device 140, one or more components of the onboard aviation operations device 180, and/or one or more other devices. In some embodiments, the software development kit 324 is a connected flight management system software development kit. In some embodiments, the onboard aviation operations device 180 is configured to store the onboard key. For example, the onboard aviation operations device 180 may be configured to store the onboard key in an onboard key database 326.

In some embodiments, the cloud-based aviation operations device 140 is configured to receive aviation operations database status data. For example, the cloud-based aviation operations device 140 may be configured to receive aviation operations database status data from the onboard aviation operations device 180. In some embodiments, aviation operations database status data includes one or more items of data representative and/or indicative of a status of the aviation operations database 190. For example, aviation operations database status data may be representative and/or indicative of an expiration date associated with the aviation operations database 190. As another example, aviation operations database status data may be representative and/or indicative of a defect associated with the aviation operations database 190 (e.g., a defect associated with the aviation operations database 190 that requires an update to fix). As another example, aviation operations database status data may be representative and/or indicative of a requested update associated with the aviation operations database 190 (e.g., a request for the aviation operations database 190 to be updated, such as from the onboard aviation operations device 180). As another example, aviation operations database status data may be representative and/or indicative of a region-based restriction associated with the aviation operations database 190 (a restriction that requires the aircraft 110 to be in a particular region for the aviation operations database 190 to be updated).

In some embodiments, the cloud-based aviation operations device 140 is configured to determine that the aviation operations database 190 is associated with an update needed status. In some embodiments, an update needed status may be a status that indicates that the aviation operations database 190 needs to be updated.

In some embodiments, the cloud-based aviation operations device 140 is configured to determine that the aviation operations database 190 is associated with an update needed status based on the aviation operations database status data. In this regard, for example, the cloud-based aviation operations device 140 may be configured to determine that the aviation operations database 190 is associated with an update needed status when aviation operations database status data indicates that an expiration date associated with the aviation operations database 190 has passed. As another example, the cloud-based aviation operations device 140 may be configured to determine that the aviation operations database 190 is associated with an update needed status when aviation operations database status data indicates that an expiration date is within a predetermined amount of time (e.g., expiration date is within ten days). As another example, the cloud-based aviation operations device 140 may be configured to determine that the aviation operations database 190 is associated with an update needed status when aviation operations database status data indicates that there is a defect associated with the aviation operations database 190. As another example, the cloud-based aviation operations device 140 may be configured to determine that the aviation operations database 190 is associated with an update needed status when aviation operations database status data indicates that an update for the aviation operations database 190 has been requested (e.g., by the onboard aviation operations device 180). As another example, the cloud-based aviation operations device 140 may be configured to determine that the aviation operations database 190 is associated with an update needed status when aviation operations database status data indicates that the aviation operations database 190 is located in a region in which the aviation operations database 190 can receive updates. In some embodiments, the cloud-based aviation operations device 140 is configured to determine that the aviation operations database 190 is associated with an update needed status using microservices 302.

In some embodiments, the cloud-based aviation operations device 140 is configured to generate an aviation operations package. In some embodiments, the cloud-based aviation operations device 140 is configured to generate an aviation operations package in response to determining that the aviation operations database 190 is associated with an update needed status. In some embodiments, the cloud-based aviation operations device 140 is configured to generate an aviation operations package using a package manager 306.

In some embodiments, an aviation operations package includes an aviation operations database update package. In some embodiments, an aviation operations database update package is a data object that is configured to update the aviation operations database 190. In some embodiments, an aviation operations package includes one or more aviation-related tuples. In this regard, for example, the one or more aviation-related tuples may serve as a salt (e.g., a cryptographic salt) such that the aviation operations database update package can only be used to update the aviation operations database 190 (e.g., such that the aviation operations database update package cannot be used to update a database associated with aircraft other than the aircraft 110).

In some embodiments, the cloud-based aviation operations device 140 is configured to encrypt the aviation operations package (e.g., encrypt the aviation operations database update package and one or more aviation-related tuples). In some embodiments, the cloud-based aviation operations device 140 is configured to encrypt the aviation operations package using the cloud-based key. In some embodiments, the cloud-based aviation operations device 140 is configured to use the package manager 306 to encrypt the aviation operations package.

In some embodiments, the cloud-based aviation operations device 140 is configured to deploy the aviation operations package to the onboard aviation operations device 180. In some embodiments, deploying the aviation operations package to the onboard aviation operations device 180 includes transmitting and/or uploading the aviation operations package to the onboard aviation operations device 180. In this regard, for example, the uploading and/or transmitting of the aviation operations package may be initiated by the over the air service 310, performed by the stream service 312, and pushed to the onboard aviation operations device 180 using the deployment service 322. In some embodiments, the stream service 312 is configured to provide the aviation operations package to the deployment service 322 using the message bus 318. In some embodiments, the cloud-based aviation operations device 140 is configured to deploy the aviation operations package to the onboard aviation operations device 180 after the aviation operations package has been encrypted.

In some embodiments, the onboard aviation operations device 180 is configured to receive the aviation operations package. For example, the onboard aviation operations device 180 may be configured to receive the aviation operations package from the cloud-based aviation operations device 140 via the avionics gateway 120 and using the software development kit 324.

In some embodiments, the onboard aviation operations device 180 is configured to decrypt the aviation operations package using the onboard key. In this regard, for example, the onboard aviation operations device 180 may be configured to retrieve the onboard key from the onboard key database 326. In some embodiments, by decrypting the aviation operations package, the onboard aviation operations device 180 is configured to access the aviation operations database update package and/or one or more aviation-related tuples. In some embodiments, the onboard aviation operations device 180 is configured to decrypt the aviation operations package using a decryption and updater service 328.

In some embodiments, the onboard aviation operations device 180 is configured to verify the aviation operations database update package using the one or more aviation-related tuples. In this regard, for example, the onboard aviation operations device 180 may be configured to verify that the one or more aviation-related tuples that were included in the aviation operations package correspond to the aircraft 110, the onboard aviation operations device 180, and/or the aviation operations database 190. In this regard, for example, it can be ensured that the aviation operations package can only be used to update an intended database (e.g., the aviation operations database 190).

For example, the onboard aviation operations device 180 may be configured to verify that an aircraft tail identification indicated by the one or more aviation-related tuples corresponds to a tail number associated with the aircraft 110. As another example, the onboard aviation operations device 180 may be configured to verify that a flight management system identification indicated by the one or more aviation-related tuples corresponds to a flight management system associated with the aircraft 110 (e.g., corresponds to the onboard aviation operations device 180 when the onboard aviation operations device 180 includes a flight management system). As another example, the onboard aviation operations device 180 may be configured to verify that an aircraft manufacturer identification indicated by the one or more aviation-related tuples corresponds to a manufacturer associated with the aircraft 110. As another example, the onboard aviation operations device 180 may be configured to verify that an aircraft type indication indicated by the one or more aviation-related tuples corresponds to a type associated with the aircraft 110 (e.g., a plane). As another example, the onboard aviation operations device 180 may be configured to verify that an aviation operations database type indication indicated by the one or more aviation-related tuples corresponds to a type of the aviation operations database 190.

In some embodiments, the onboard aviation operations device 180 is configured to perform one or more update viability operations on the aviation operations database 190. In some embodiments, an update viability operation may be an operation that is performed to assess the aviation operations database 190 viability for being updated (e.g., can the aviation operations database 190 be updated). In some embodiments, for example, an update viability operation may include determining the amount of available memory of the aviation operations database 190 (e.g., determining if the aviation operations database 190 has enough available memory to be updated). As another example, an update viability operation may include determining whether a current date and/or current time associated with the aviation operations database 190 matches an expected date and/or an expected time (e.g., to determine whether the aviation operations database 190 is in a region in which the aviation operations database 190 can be updated).

As another example, an update viability operation may include determine a format of the aviation operations database 190 (e.g., determining if a format of the aviation operations database 190 is an acceptable format for performing an update). As another example, an update viability operation may include determining a software version of the aviation operations database 190 (e.g., determining if a software version of the aviation operations database 190 is an acceptable software version for performing an update). As another example, an update viability operation may include determining an energy state associated with the aviation operations database 190. In this regard, for example, an update viability operation may determine if an energy state associated with the aviation operations database 190 indicates that the aircraft 110 is on the ground (e.g., as opposed to the aircraft 110 being in flight). In some embodiments, the onboard aviation operations device 180 is configured to perform one or more update viability operations on the aviation operations database 190 using the decryption and updater service 328.

In some embodiments, the onboard aviation operations device 180 is configured to cause the aviation operations database 190 to be updated using the aviation operations database update package. In some embodiments, the onboard aviation operations device 180 is configured to cause the aviation operations database 190 to be updated in response to a determination that the aviation operations database 190 has completed one or more update viability operations. In some embodiments, the onboard aviation operations device 180 is configured to cause the aviation operations database 190 to be updated in accordance with an ARINC 615 protocol. In some embodiments, the onboard aviation operations device 180 is configured to cause the aviation operations database 190 to be updated using the decryption and updater service 328.

In some embodiments, the onboard aviation operations device 180 is configured to perform one or more update loaded operations on the aviation operations database 190. In some embodiments, an update loaded operation may be an operation that is performed to assess whether the aviation operations database 190 has been successfully updated. In some embodiments, for example, an update loaded operation may include performing a checksum check on the aviation operations database 190. As another example, an update loaded operation may include performing a cyclic redundancy check on the aviation operations database 190. As another example, an update loaded operation may include performing a configuration check on the aviation operations database 190. As another example, an update loaded operation may include performing a compatibility check on the aviation operations database 190. In some embodiments, the onboard aviation operations device 180 is configured to perform one or more update loaded operations on the aviation operations database 190 using the decryption and updater service 328.

In some embodiments, the onboard aviation operations device 180 is configured to generate an aviation operations interface component 402. In some embodiments, the aviation operations interface component 402 may be configured to display a status associated with an update of the aviation operations database 190. For example, the aviation operations interface component 402 may be configured to display an indication that an update of the aviation operations database 190 is in progress. As another example, the aviation operations interface component 402 may be configured to display an indication that an update of the aviation operations database 190 has been completed. Additionally, or alternatively, the aviation operations interface component 402 may be configured to display a result of one or more update viability operations. For example, the aviation operations interface component 402 may be configured to display an indication that an update viability operation was performed successfully and/or unsuccessfully. Additionally, or alternatively, the aviation operations interface component 402 may be configured to display a result of one or more update loaded operations. For example, the aviation operations interface component 402 may be configured to display an indication that an update loaded operation was performed successfully and/or unsuccessfully.

Figure 4:
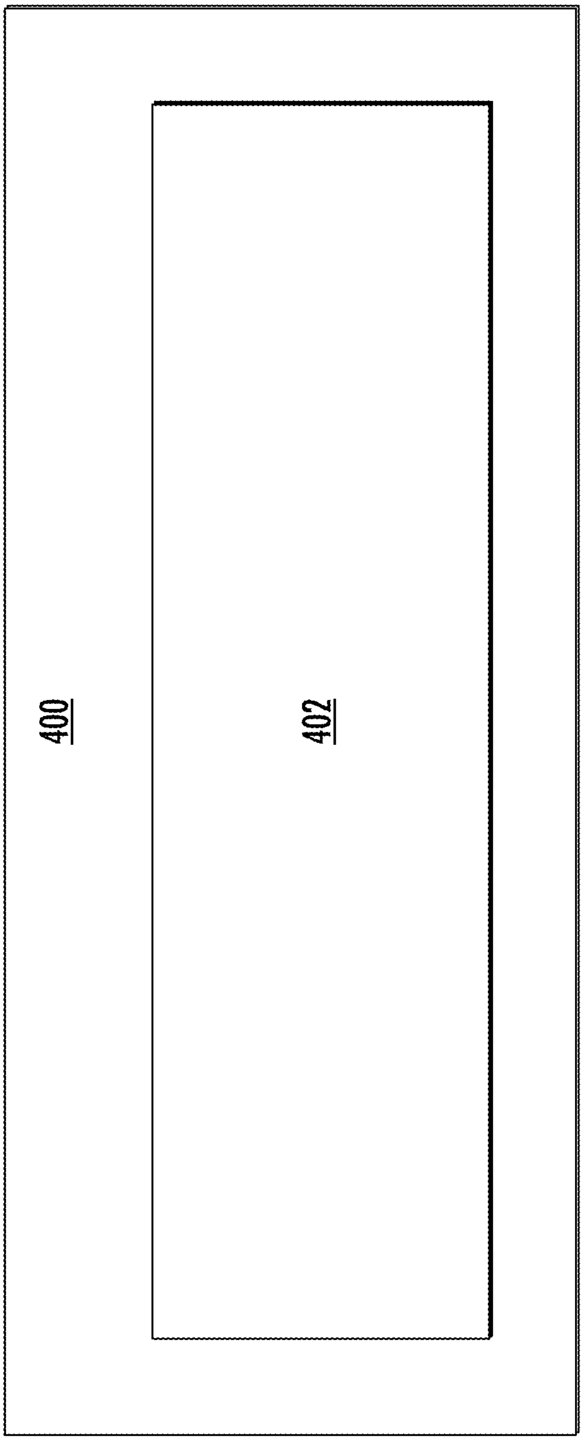
FIG. 4 illustrates an interface component in accordance with one or more embodiments of the present disclosure.

In some embodiments, the onboard aviation operations device 180 is configured to cause the aviation operations interface component 402 to be rendered to an aviation operations interface 400, such as illustrated in FIG. 4. In some embodiments, the onboard aviation operations device 180 is configured to use an interface service 330 to cause the aviation operations interface component 402 to be rendered to the aviation operations interface 400. In some embodiments, the aviation operations interface 400 may be associated with the onboard aviation operations device 180 and/or the cloud-based aviation operations device 140.

Example Methods

Figure 5:
FIG. 5 illustrates a flowchart of an example method in accordance with one or more embodiments of the present disclosure.

Referring now to FIG. 5, a flowchart providing an example method 500 is illustrated. In this regard, FIG. 5 illustrates operations that may be performed by the cloud-based aviation operations device 140, the avionics gateway 120, the onboard aviation operations device 180, the aircraft 110, the one or more databases 170, the aviation operations database, and/or the like. In some embodiments, the method 500 includes operations for deploying an aviation operations package to an onboard aviation operations. In some embodiments, the example method 500 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 500.

As shown in block 502, the method 500 may include receiving aviation operations database status data associated with an aviation operations database. As described above, in some embodiments, the cloud-based aviation operations device may be configured to receive aviation operations database status data from the onboard aviation operations device. In some embodiments, aviation operations database status data includes one or more items of data representative and/or indicative of a status of the aviation operations database. For example, aviation operations database status data may be representative and/or indicative of an expiration date associated with the aviation operations database. As another example, aviation operations database status data may be representative and/or indicative of a defect associated with the aviation operations database (e.g., a defect associated with the aviation operations database that requires an update to fix). As another example, aviation operations database status data may be representative and/or indicative of a requested update associated with the aviation operations database (e.g., a request for the aviation operations database to be updated, such as from the onboard aviation operations device). As another example, aviation operations database status data may be representative and/or indicative of a region-based restriction associated with the aviation operations database (a restriction that requires the aircraft to be in a particular region for the aviation operations database to be updated).

As shown in block 504, the method 500 may include generating an aviation operations package based on the aviation operations database status data. As described above, in some embodiments, the cloud-based aviation operations device is configured to generate an aviation operations package in response to determining that the aviation operations database is associated with an update needed status. In some embodiments, the cloud-based aviation operations device is configured to generate an aviation operations package using a package manager.

In some embodiments, an aviation operations package includes an aviation operations database update package. In some embodiments, an aviation operations database update package is a data object that is configured to update the aviation operations database. In some embodiments, an aviation operations package includes one or more aviation-related tuples. In this regard, for example, the one or more aviation-related tuples may serve as a salt (e.g., a cryptographic salt) such that the aviation operations database update package can only be used to update the aviation operations database (e.g., such that the aviation operations database update package cannot be used to update a database associated with aircraft other than the aircraft).

As shown in block 506, the method 500 may include encrypting the aviation operations package using a cloud-based key. As described above, in some embodiments, the cloud-based aviation operations device is configured to encrypt the aviation operations package using the cloud-based key. In some embodiments, the cloud-based aviation operations device is configured to use the package manager to encrypt the aviation operations package.

As shown in block 508, the method 500 may include deploying the aviation operations package to an onboard aviation operations device. As described above, in some embodiments, deploying the aviation operations package to the onboard aviation operations device includes transmitting and/or uploading the aviation operations package to the onboard aviation operations device. In this regard, for example, the uploading and/or transmitting of the aviation operations package may be initiated by the over the air service, performed by the stream service, and pushed to the onboard aviation operations device using the deployment service. In some embodiments, the stream service is configured to provide the aviation operations package to the deployment service using the message bus. In some embodiments, the cloud-based aviation operations device is configured to deploy the aviation operations package to the onboard aviation operations device after the aviation operations package has been encrypted.

As shown in optional block 510, the method 500 may optionally include receiving aircraft registration data. As described above, in some embodiments, aircraft registration data includes one or more items of data representative and/or indicative of an aircraft registration request. In some embodiments, an aircraft registration request is a request for participation in over the air updates that are provided by the cloud-based aviation operations device. For example, an aircraft registration request may be a request for participation in over the air updates for the aviation operations database that is provided by the cloud-based aviation operations device.

Additionally, or alternatively, aircraft registration data comprises one or more items of data representative and/or indicative of one or more aviation-related tuples. For example, an aviation-related tuple may be indicative of an aircraft tail identification (e.g., a tail number associated with the aircraft. As another example, an aviation-related tuple may be indicative of a flight management system identification (e.g., a flight management system associated with the aircraft). As another example, an aviation-related tuple may be indicative of an aircraft manufacturer identification (e.g., an identification of a manufacturer of the aircraft). As another example, an aviation-related tuple may be indicative of an aircraft type indication (e.g., a type of the aircraft, such as an airplane, helicopter, unmanned aerial vehicle, (UAV), etc.). As another example, an aviation-related tuple may be indicative of an aircraft region indication (e.g., a country in which the aircraft is based). As another example, an aviation-related tuple may be indicative of an aviation operations database type indication. For example, an aviation operations database type indication may be one or more of a navigation database, a magnetic variation database (e.g., a MagVar database), a takeoff and landing data database (e.g., a TOLD database), an aero-engine database (e.g., an AEDB database), and/or the like.

In some embodiments, the cloud-based aviation operations device is configured to receive at least a portion of aircraft registration data from the onboard aviation operations device. In this regard, for example, the onboard aviation operations device may be configured to transmit aircraft registration data to the cloud-based aviation operations device via the avionics gateway. Additionally, or alternatively, the cloud-based aviation operations device is configured to receive at least a portion of aircraft registration data from one or more other computing devices. For example, the cloud-based aviation operations device may be configured to receive at least a portion of aircraft registration data from a remote computing device (e.g., an enterprise computing device associated with an enterprise that owns and/or operates the aircraft). Additionally, or alternatively, the cloud-based aviation operations device is configured to receive at least a portion of aircraft registration data directly into the cloud-based aviation operations device (e.g., aircraft registration data may be inputted directly into the cloud-based aviation operations device). In this regard, for example, the cloud-based aviation operations device may include a cloud-based internet of things hub configured to facilitate receiving aircraft registration data by the cloud-based aviation operations device.

As shown in optional block 512, the method 500 may optionally include determining that the aviation operations database is associated with an update needed status based on the aviation operations database status data. As described above, in some embodiments, an update needed status may be a status that indicates that the aviation operations database needs to be updated.

In some embodiments, the cloud-based aviation operations device is configured to determine that the aviation operations database is associated with an update needed status based on the aviation operations database status data. In this regard, for example, the cloud-based aviation operations device may be configured to determine that the aviation operations database is associated with an update needed status when aviation operations database status data indicates that an expiration date associated with the aviation operations database has passed. As another example, the cloud-based aviation operations device may be configured to determine that the aviation operations database is associated with an update needed status when aviation operations database status data indicates that an expiration date is within a predetermined amount of time (e.g., expiration date is within ten days). As another example, the cloud-based aviation operations device may be configured to determine that the aviation operations database is associated with an update needed status when aviation operations database status data indicates that there is a defect associated with the aviation operations database. As another example, the cloud-based aviation operations device may be configured to determine that the aviation operations database is associated with an update needed status when aviation operations database status data indicates that an update for the aviation operations database has been requested (e.g., by the onboard aviation operations device). As another example, the cloud-based aviation operations device may be configured to determine that the aviation operations database is associated with an update needed status when aviation operations database status data indicates that the aviation operations database is located in a region in which the aviation operations database can receive updates. In some embodiments, the cloud-based aviation operations device is configured to determine that the aviation operations database is associated with an update needed status using microservices.

Figure 6:
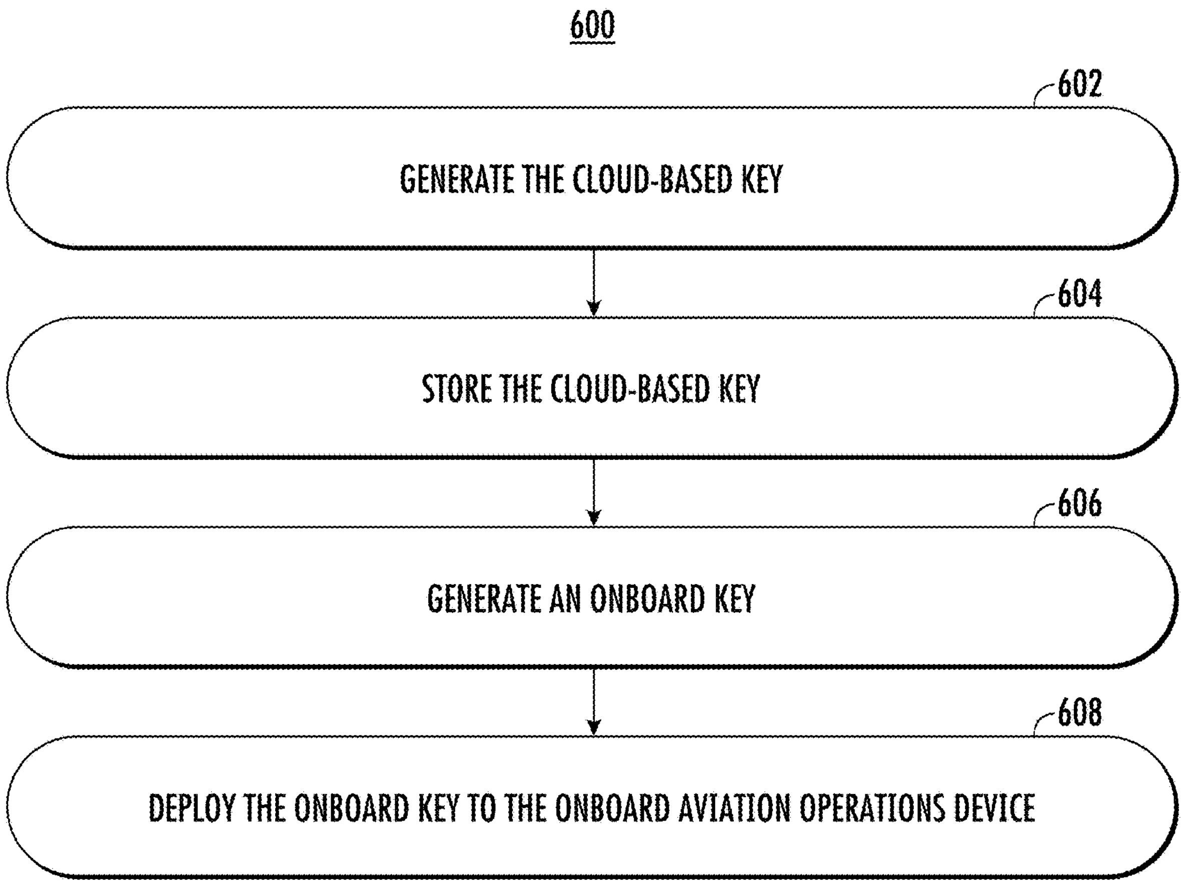
FIG. 6 illustrates a flowchart of an example method in accordance with one or more embodiments of the present disclosure.

Referring now to FIG. 6, a flowchart providing an example method 600 is illustrated. In this regard, FIG. 6 illustrates operations that may be performed by the cloud-based aviation operations device 140, the avionics gateway 120, the onboard aviation operations device 180, the aircraft 110, the one or more databases 170, the aviation operations database, and/or the like. In some embodiments, the method 600 includes operations for deploying an onboard key to an onboard aviation operations device. In some embodiments, the example method 600 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 600.

As shown in block 602, the method 600 may include generating the cloud-based key. As described above, in some embodiments, a cloud-based key is a unique cryptographic key that may be used by the cloud-based aviation operations device to encrypt data and/or information, such that data and/or information may be transmitted securely from the cloud-based aviation operations device. In some embodiments, the cloud-based key corresponds to a public key. In some embodiments, the cloud-based aviation operations device is configured to generate the cloud-based key using cryptographic service.

As shown in block 604, the method 600 may include storing the cloud-based key. As described above, in some embodiments, the cloud-based aviation operations device is configured to store the cloud-based key in a cloud-based key database. In some embodiments, the cloud-based key may be transferred from the cryptographic service to the cloud-based key database using a message bus.

As shown in block 606, the method 600 may include generating an onboard key.

As described above, in some embodiments, an onboard key is a unique cryptographic key that may be used by the onboard aviation operations device to decrypt data and/or information, such that data and/or information may be transmitted securely to the onboard aviation operations device (e.g., the onboard aviation operations device can receive encrypted data from the cloud-based aviation operations device and decrypt the received data). In some embodiments, the onboard key corresponds to a private key. In some embodiments, the cloud-based aviation operations device is configured to generate the onboard key using cryptographic service.

As shown in block 608, the method 600 may include deploying the onboard key to the onboard aviation operations device. As described above, in this regard, for example, the cloud-based aviation operations device may be configured to transmit the onboard key to the onboard aviation operations device. In some embodiments, the cloud-based aviation operations device is configured to use deployment service to deploy the onboard key to the onboard aviation operations device via the avionics gateway. In this regard, for example, the onboard key may be provided from the cryptographic service to the deployment service using the message bus.

Figure 7:
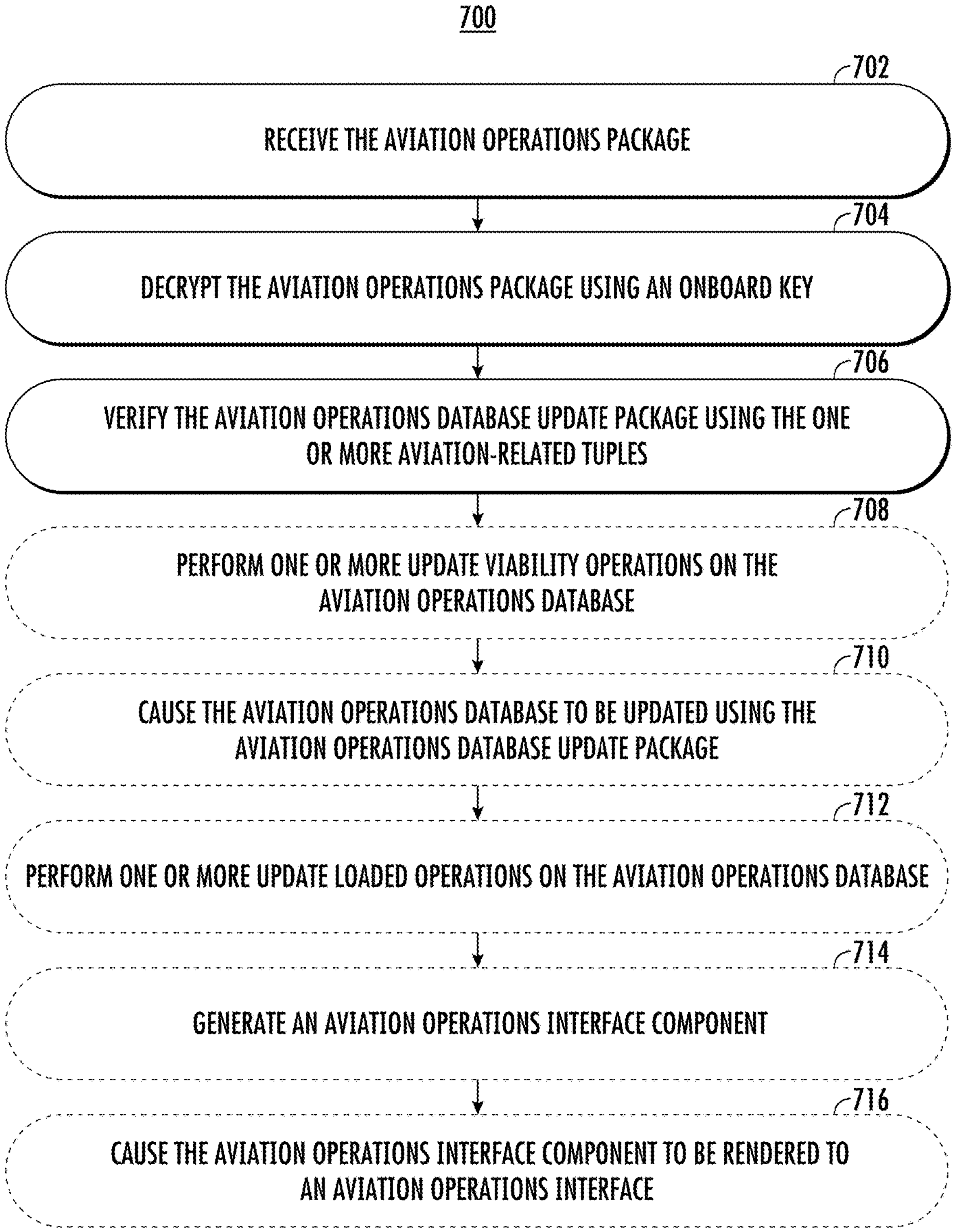
FIG. 7 illustrates a flowchart of an example method in accordance with one or more embodiments of the present disclosure.

Referring now to FIG. 7, a flowchart providing an example method 700 is illustrated. In this regard, FIG. 7 illustrates operations that may be performed by the cloud-based aviation operations device 140, the avionics gateway 120, the onboard aviation operations device 180, the aircraft 110, the one or more databases 170, the aviation operations database, and/or the like. In some embodiments, the method 700 includes operations for deploying an onboard key to an onboard aviation operations device. In some embodiments, the example method 700 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 700.

As shown in block 702, the method 700 may include receiving the aviation operations package. As described above, in some embodiments, the onboard aviation operations device may be configured to receive the aviation operations package from the cloud-based aviation operations device via the avionics gateway and using the software development kit.

As shown in block 704, the method 700 may include decrypting the aviation operations package using an onboard key. As described above, in some embodiments, this regard, for example, the onboard aviation operations device may be configured to retrieve the onboard key from the onboard key database. In some embodiments, by decrypting the aviation operations package, the onboard aviation operations device is configured to access the aviation operations database update package and/or one or more aviation-related tuples. In some embodiments, the onboard aviation operations device is configured to decrypt the aviation operations package using a decryption and updater service.

As shown in block 706, the method 700 may include verifying the aviation operations database update package using the one or more aviation-related tuples. As described above, in some embodiments, the onboard aviation operations device is configured to verify the aviation operations database update package using the one or more aviation-related tuples. In this regard, for example, the onboard aviation operations device may be configured to verify that the one or more aviation-related tuples that were included in the aviation operations package correspond to the aircraft, the onboard aviation operations device, and/or the aviation operations database. In this regard, for example, it can be ensured that the aviation operations package can only be used to update an intended database (e.g., the aviation operations database).

For example, the onboard aviation operations device may be configured to verify that an aircraft tail identification indicated by the one or more aviation-related tuples corresponds to a tail number associated with the aircraft. As another example, the onboard aviation operations device may be configured to verify that a flight management system identification indicated by the one or more aviation-related tuples corresponds to a flight management system associated with the aircraft (e.g., corresponds to the onboard aviation operations device when the onboard aviation operations device includes a flight management system). As another example, the onboard aviation operations device may be configured to verify that an aircraft manufacturer identification indicated by the one or more aviation-related tuples corresponds to a manufacturer associated with the aircraft. As another example, the onboard aviation operations device may be configured to verify that an aircraft type indication indicated by the one or more aviation-related tuples corresponds to a type associated with the aircraft (e.g., a plane). As another example, the onboard aviation operations device may be configured to verify that an aviation operations database type indication indicated by the one or more aviation-related tuples corresponds to a type of the aviation operations database.

As shown in optional block 708, the method 700 may optionally include performing one or more update viability operations on the aviation operations database. As described above, in some embodiments, an update viability operation may be an operation that is performed to assess the aviation operations database viability for being updated (e.g., can the aviation operations database be updated). In some embodiments, for example, an update viability operation may include determining the amount of available memory of the aviation operations database (e.g., determining if the aviation operations database has enough available memory to be updated). As another example, an update viability operation may include determining whether a current date and/or current time associated with the aviation operations database matches an expected date and/or an expected time (e.g., to determine whether the aviation operations database is in a region in which the aviation operations database can be updated).

As another example, an update viability operation may include determine a format of the aviation operations database (e.g., determining if a format of the aviation operations database is an acceptable format for performing an update). As another example, an update viability operation may include determining a software version of the aviation operations database (e.g., determining if a software version of the aviation operations database is an acceptable software version for performing an update). As another example, an update viability operation may include determining an energy state associated with the aviation operations database. In this regard, for example, an update viability operation may determine if an energy state associated with the aviation operations database indicates that the aircraft is on the ground (e.g., as opposed to the aircraft being in flight). In some embodiments, the onboard aviation operations device is configured to perform one or more update viability operations on the aviation operations database using the decryption and updater service.

As shown in optional block 710, the method 700 may optionally include causing the aviation operations database to be updated using the aviation operations database update package. As described above, in some embodiments, the onboard aviation operations device is configured to cause the aviation operations database to be updated in response to a determination that the aviation operations database has completed one or more update viability operations. In some embodiments, the onboard aviation operations device is configured to cause the aviation operations database to be updated in accordance with an ARINC 615 protocol. In some embodiments, the onboard aviation operations device is configured to cause the aviation operations database to be updated using the decryption and updater service.

As shown in optional block 712, the method 700 may optionally include performing one or more update loaded operations on the aviation operations database. As described above, in some embodiments, an update loaded operation may be an operation that is performed to assess whether the aviation operations database has been successfully updated. In some embodiments, for example, an update loaded operation may include performing a checksum check on the aviation operations database. As another example, an update loaded operation may include performing a cyclic redundancy check on the aviation operations database. As another example, an update loaded operation may include performing a configuration check on the aviation operations database. As another example, an update loaded operation may include performing a compatibility check on the aviation operations database. In some embodiments, the onboard aviation operations device is configured to perform one or more update loaded operations on the aviation operations database using the decryption and updater service.

As shown in optional block 714, the method 700 may optionally include generating an aviation operations interface component. As described above, in some embodiments, the aviation operations interface component may be configured to display a status associated with an update of the aviation operations database. For example, the aviation operations interface component may be configured to display an indication that an update of the aviation operations database is in progress. As another example, the aviation operations interface component may be configured to display an indication that an update of the aviation operations database has been completed. Additionally, or alternatively, the aviation operations interface component may be configured to display a result of one or more update viability operations. For example, the aviation operations interface component may be configured to display an indication that an update viability operation was performed successfully and/or unsuccessfully. Additionally, or alternatively, the aviation operations interface component may be configured to display a result of one or more update loaded operations. For example, the aviation operations interface component may be configured to display an indication that an update loaded operation was performed successfully and/or unsuccessfully.

As shown in optional block 716, the method 700 may optionally include causing the aviation operations interface component to be rendered to an aviation operations interface. As described above, in some embodiments, the onboard aviation operations device is configured to use an interface service to cause the aviation operations interface component to be rendered to the aviation operations interface. In some embodiments, the aviation operations interface may be associated with the onboard aviation operations device and/or the cloud-based aviation operations device.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

The invention claimed is:

1. A system comprising:
- a cloud-based aviation operations device comprising memory and one or more processors communicatively coupled to the memory, the one or more processors configured to:
  - receive aviation operations database status data associated with an aviation operations database;
  - generate an aviation operations package based on the aviation operations database status data, wherein the aviation operations package comprises an aviation operations database update package and one or more aviation-related tuples wherein the one or more aviation-related tuples serve as a cryptographic salt;
  - encrypt the aviation operations package using a cloud-based key; and
  - deploy the aviation operations package to an onboard aviation operations device.

2. The system of claim 1, wherein the aviation operations database status data is received from the onboard aviation operations device.

3. The system of claim 1, wherein the one or more aviation-related tuples are indicative of one or more of an aircraft tail identification, a flight management system identification, an aircraft manufacturer identification, an aircraft type indication, an aviation operations database type indication, or an aircraft region indication.

4. The system of claim 1, wherein the onboard aviation operations device comprises a flight management system.

5. The system of claim 1, wherein the onboard aviation operations device is physically secured to an aircraft.

6. The system of claim 1, wherein the aviation operations package is deployed to the onboard aviation operations device via an avionics gateway.

7. The system of claim 1, wherein the one or more processors are further configured to:
- receive aircraft registration data, wherein the aircraft registration data comprises an aircraft registration request and one or more aviation-related tuples.

8. The system of claim 1, wherein the one or more processors are further configured to:
- generate the cloud-based key;
- store the cloud-based key;
- generate an onboard key; and
- deploy the onboard key to the onboard aviation operations device.

9. The system of claim 1, wherein the one or more processors are further configured to:
- determine that the aviation operations database is associated with an update needed status based on the aviation operations database status data, wherein the aviation operations package is generated in response to the determination that the aviation operations database is associated with the update needed status.

10. The system of claim 1, further comprising:
- the onboard aviation operations device comprising second memory and one or more second processors communicatively coupled to the second memory, the one or more second processors configured to:
  - receive the aviation operations package;
  - decrypt the aviation operations package using an onboard key, wherein the aviation operations package comprises the aviation operations database update package and the one or more aviation-related tuples; and
  - verify the aviation operations database update package using the one or more aviation-related tuples.

11. The system of claim 10, wherein the one or more second processors are further configured to:
- perform one or more update viability operations on the aviation operations database.

12. The system of claim 10, wherein the one or more second processors are further configured to:
- cause the aviation operations database to be updated using the aviation operations database update package.

13. The system of claim 12, wherein the one or more second processors are further configured to:
- perform one or more update loaded operations on the aviation operations database.

14. The system of claim 10, wherein the one or more second processors are further configured to:
- generate an aviation operations interface component; and
- cause the aviation operations interface component to be rendered to an aviation operations interface.

15. The system of claim 10, wherein the one or more second processors are further configured to verify that the one or more aviation-related tuples included in the aviation operations package correspond to one or more of an aircraft, the onboard aviation operations device, or the aviation operations database.

16. A method comprising:
- receiving aviation operations database status data associated with an aviation operations database;
- generating an aviation operations package based on the aviation operations database status data, wherein the aviation operations package comprises an aviation operations database update package and one or more aviation-related tuples, wherein the one or more aviation-related tuples serve as a cryptographic salt;
- encrypting the aviation operations package using a cloud-based key; and
- deploying the aviation operations package to an onboard aviation operations device.

17. The method of claim 16, further comprising:
- generating the cloud-based key;
- storing the cloud-based key;
- generating an onboard key; and
- deploying the onboard key to the onboard aviation operations device.

18. The method of claim 16, further comprising:
- receiving the aviation operations package;
- decrypting the aviation operations package using an onboard key, wherein the aviation operations package comprises an aviation operations database update package and one or more aviation-related tuples; and verifying the aviation operations database update package using the one or more aviation-related tuples.

19. A computer program product comprising at least one non-transitory computer-readable storage medium having computer program code stored thereon that, in execution with at least one processor, configures the computer program product for:

receiving aviation operations database status data associated with an aviation operations database;

generating an aviation operations package based on the aviation operations database status data, wherein the aviation operations package comprises an aviation operations database update package and one or more aviation-related tuples, wherein the one or more aviation-related tuples serve as a cryptographic salt;

encrypting the aviation operations package using a cloud-based key; and deploying the aviation operations package to an onboard aviation operations device.

* * * * *